(12) United States Patent
Matsumura et al.

(10) Patent No.: US 6,203,892 B1
(45) Date of Patent: Mar. 20, 2001

(54) MAGNETIC RECORDING MEDIUM AND MANUFACTURING METHOD THEREFOR

(75) Inventors: Shinichi Matsumura; Naoto Maeda, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/244,205

(22) Filed: Feb. 4, 1999

(30) Foreign Application Priority Data

Feb. 13, 1998 (JP) .................................................. 10-031813
Jun. 2, 1998 (JP) .................................................. 10-152971

(51) Int. Cl.$^7$ ....................................................... G11B 5/73

(52) U.S. Cl. .......................... 428/212; 428/336; 428/337; 428/480; 428/694 SL; 428/900; 427/130

(58) Field of Search .................................. 428/65.3, 212, 428/336, 337, 480, 694 SL, 900; 427/130

(56) References Cited

U.S. PATENT DOCUMENTS 4,861,674 * 8/1989 Inaba et al. ............................ 428/480
5,547,704 * 8/1996 Nagashima et al. ................... 427/130

FOREIGN PATENT DOCUMENTS

11283243 * 10/1999 (JP).

* cited by examiner

*Primary Examiner*—Stevan A. Resan
(74) *Attorney, Agent, or Firm*—Sonnenschein, Nath & Rosenthal

(57) ABSTRACT

It is an object to provide a magnetic recording medium which is capable of satisfactorily preventing deformation thereof and maintaining an excellent state of contact with a magnetic head, which exhibits satisfactory durability and an excellent recording/reproducing characteristic and which is able to realize a high linear recording density. A magnetic recording medium incorporates a non-magnetic support member in the form of a biaxially-oriented polyethylene terephthalate film and magnetic layers formed on the non-magnetic support member and containing ferromagnetic powder and a polymer material. The non-magnetic support member is structured such that difference $\Delta n_1$ between a refractive index of a first main surface and that of a second main surface is $1 \times 10^{-3}$ or smaller. It is preferable that the thickness of the non-magnetic support member is 30 $\mu$m or greater, a coefficient of thermal contraction at 80° C. is 0.1% or lower and the difference $\Delta n_2$ between a maximum value and a minimum value of the refractive index in each main surface is $15 \times 10^{-3}$ or smaller. It is preferable that magnetic layers contain thermosetting polyisocyanate.

10 Claims, 3 Drawing Sheets

MAGNETIC RECORDING MEDIUM AND MANUFACTURING METHOD THEREFOR

RELATED APPLICATION DATA

The present application claims priority to Japanese Application Nos. P10 031813 filed Feb. 13, 1998 and P10-152971 filed Jun. 02, 1998 which applications are incorporated herein by reference to the extent permitted by law.

BACKGROUND OF THE INVENTION

1. Field of the Invention

The present invention relates to a magnetic recording medium and a manufacturing method therefor, and more particularly to a magnetic recording medium which is capable of preventing deformation, such as a curl, and undesirable contact with a magnetic head and which can, therefore, be operated many times. More particularly, the present invention relates to a disc-shape recording medium which permits a high track density realizing a high linear recording density, and more particularly to a magnetic recording medium for use as an original material for flexible discs and a manufacturing method therefor.

2. Related Background Art

Hitherto, a disc-shape magnetic recording medium (hereinafter called a "magnetic disc") incorporates a non-magnetic support member made of polyethylene terephthalate and having two main surfaces on each of which a magnetic layer is formed which is made of a mixture of a polymer material and ferromagnetic power. To raise the linear recording density of a magnetic disc of the foregoing type, an attempt has been made to reduce the track width.

To raise the linear recording density of the magnetic disc for use in the magnetic disc drive, the distance from a magnetic head to the magnetic disc has been reduced.

The conventional magnetic disc drive, however, suffers from a problem of deformation of the magnetic disc which must be overcome to pursue development in order to raise the linear recording density. The conventional magnetic disc drive easily encounters a tracking error and rise in the error rate if the magnetic disc is deformed. As a result, the linear recording density of the magnetic disc cannot easily be raised.

To overcome the deformation and change in the dimension occurring during reservation of the magnetic disc, a method of manufacturing a magnetic disc has been disclosed in Japanese Patent Laid-Open No. 62-124630. The disclosed manufacturing method will now be described.

The foregoing manufacturing method has steps of winding an original material for manufacturing magnetic recording mediums into a roll shape; subjecting roll-shape original material for manufacturing the magnetic recording mediums to a heating process for the purpose of enhancing reactions of a binder and a crosslinking material in the magnetic layer; and unwinding the roll-shape original material for manufacturing the magnetic recording mediums into a sheet shape; and punching the sheet-shape material into disc shapes.

That is, the foregoing method is a method having the steps of subjecting the magnetic recording medium wound into the roll shape to the heating process for activating the binder and the crosslinking material in the magnetic layer to increase the strength of the magnetic layer; and punching the original material for manufacturing the magnetic recording mediums into disc shapes. Therefore, the magnetic disc obtained by the punching process has the increased strength. Thus, deformation and undesirable change in the dimension can satisfactorily be prevented.

The foregoing method, however, suffers from the following problems. That is, the original material for manufacturing the magnetic recording mediums in a state in which the original material has been wound into the roll shape is subjected to the heating process. Therefore, deformation of the original material of the magnetic recording medium when it is wound causes the original material of the magnetic recording medium to be warped when it is rewound into a sheet shape, that is, curled. A portion of the original material of the magnetic recording medium wound tightly into the roll shape is deformed when the original material is rewound into the sheet. Another problem arises in this case in that the characteristic of the surface of the magnetic layer deteriorates.

A magnetic disc manufactured by punching, into the disc shape, the original material of the magnetic recording medium having deformation, such as a curl, is deformed. As a result, the contact with the magnetic head becomes non-uniform. If the magnetic disc is operated many times, the magnetic layer is worn excessively. Thus, the magnetic disc cannot smoothly be rotated when a recording operation or a reproducing operation is performed. As a result, there arises a problem of unsatisfactory durability and deterioration in the recording/reproducing characteristic.

To overcome the above-mentioned problems, a contrivance has been suggested which has a structure that the coefficient of thermal contraction of a non-magnetic support member is controlled to satisfactorily prevent deformation of the original material of the magnetic recording medium occurring by dint of heat. Thus, deformation of the magnetic disc is attempted to be prevented.

However, the above-mentioned conventional contrivances for preventing deformation cannot attain a satisfactory effect. Thus, deformation of the magnetic disc cannot completely be prevented after the magnetic disc has been preserved or after the magnetic disc has been subjected to heat treatment.

SUMMARY OF THE INVENTION

In view of the foregoing, an object of the present invention is to provide a magnetic recording medium which is capable of satisfactorily preventing deformation and maintaining excellent contact with a magnetic head, which exhibits satisfactory durability and which realizes excellent recording/reproducing characteristic and thus permits a high linear recording density and a manufacturing method therefor.

To achieve the foregoing object, according to one aspect of the present invention, there is provided a magnetic recording medium comprising: a non-magnetic support member composed of a biaxially-oriented polyethylene terephthalate film; and a magnetic layer formed on at least one of the main surfaces of the non-magnetic support member and containing at least ferromagnetic powder and a polymer material. In particular, the magnetic recording medium according to the present invention is characterized in that difference $\Delta n_1$ between refractive indexes of the two main surfaces of the non-magnetic support member is $1 \times 10^{-3}$ or smaller. It is preferable that the thickness of the non-magnetic support member is 30 $\mu$m or greater It is preferable that the magnetic recording medium according to the present invention has a structure that a coefficient of thermal contraction of the non-magnetic support member at 80° C. is 0.1% or lower.

It is preferable that the magnetic recording medium according to the present invention has a structure that the magnetic layer contains thermosetting polyisocyanate.

It is preferable that the magnetic recording medium according to the present invention has a structure that difference $\Delta n_2$ between a maximum value and a minimum value of the refractive index of each of the main surfaces of the non-magnetic support member is $15 \times 10^{-3}$ or smaller.

It is preferable that the magnetic recording medium according to the present invention has a structure that the magnetic layer is formed on each of the two main surfaces of the non-magnetic support member so that the magnetic recording medium is used as an original material for manufacturing magnetic discs.

The magnetic recording medium according to the present invention has the structure that the difference $\Delta n_1$ between the refractive indexes of the two main surfaces of the non-magnetic support member is $1 \times 10^{-3}$ or smaller. Thus, the difference in the physical properties between the two main surfaces of the non-magnetic support member can be reduced. As a result, the physical properties of the non-magnetic support member can satisfactorily be uniformed. Therefore, the magnetic recording medium according to the present invention is able to satisfactorily prevent deformation including a curl of the non-magnetic support member in a specific direction even after preservation and/or heat treatment has been performed. As a result, a magnetic recording medium free from considerable deformation can be prevented.

Therefore, the magnetic recording medium according to the present invention can uniformly and satisfactorily be brought into contact with the magnetic head. Thus, change in the contact with the magnetic head can sufficiently be prevented. As a result, excellent movement characteristic, durability and recording/reproducing characteristic can be realized with which the magnetic recording medium can be used many times such that errors including displacement of a track can be prevented when a recording/reproducing operation is performed.

The magnetic recording medium according to the present invention has the structure that the thickness of the non-magnetic support member is 30 μm or greater. Therefore, the ratio of the thickness of the non-magnetic support member with respect to the overall thickness of the magnetic recording medium is raised. Thus, the shape of the magnetic recording medium is determined by the shape of the non-magnetic support member. Therefore, the magnetic recording medium according to present invention is able to further effectively prevent deformation thereof.

Moreover, the magnetic recording medium according to the present invention has the structure that the coefficient of thermal contraction of the non-magnetic support member at 80° C. is 0.1% or lower. Therefore, deformation of the non-magnetic support member in a specific direction can satisfactorily be prevented after heat treatment has been performed. Also the above-mentioned structure enables the magnetic recording medium according to the present invention to be a magnetic recording medium which is free from considerable deformation. As a result, change in the contact with the magnetic head can satisfactorily be prevented. As a result, excellent movement characteristic, durability and recording/reproducing characteristic can be realized with which the magnetic recording medium can be used many times such that errors including displacement of a track can be prevented when a recording/reproducing operation is performed.

The magnetic recording medium according to the present invention has the structure that the difference $\Delta n_2$ between a maximum value and a minimum value of the refractive index of each of the main surfaces of the non-magnetic support member is determined as described above. Therefore, the main surfaces of the non-magnetic support member have a satisfactorily uniform surface characteristic. As a result, the magnetic recording medium according to the present invention is able to satisfactorily prevent local deformation of the main surfaces of the non-magnetic support member even after the non-magnetic support member has been subjected to heat treatment or after the same has been preserved. As a result, the magnetic recording medium has a satisfactory surface characteristic. Therefore, the magnetic recording medium according to the present invention realizes an excellent state of contact with the magnetic head. Hence, the magnetic recording medium according to the present invention can be used many times while an error, such as displacement of a track occurring during a recording/reproducing operation, can be prevented.

According to another aspect of the present invention, there is provided a method of manufacturing a magnetic recording medium, comprising: a coating step for forming a magnetic layer by coating the surface of a non-magnetic support member with a magnetic coating material mainly composed of ferromagnetic powder and a polymer material and by drying the magnetic coating material; a step for flattening and smoothing the surface of the magnetic layer; a cutting step for manufacturing a magnetic disc by punching, into a disc shape, the non-magnetic support member having the magnetic layer formed thereon; and a heat treatment step for performing heat treatment of the magnetic disc at temperatures higher than a glass transition point of the polymer material and lower than a glass transition point of the non-magnetic support member, wherein the non-magnetic support member is a biaxially-oriented polyethylene terephthalate film having two main surfaces, difference $\Delta n_1$ between refractive indexes of which is $1 \times 10^{-3}$ or smaller, the thickness of the non-magnetic support member is 30 μm or greater and a coefficient of thermal contraction of the non-magnetic support member at 80° C. is 0.1% or lower. Thus, if the magnetic coating material contains thermosetting polyisocyanate which is a crosslinking compound, the magnetic layer is able to withstand heat treatment temperatures of, for example, 50° C. to 90° C. which are sufficiently high levels to enhance crosslinking reactions of the crosslinking compound. As a result, the strength of the magnetic layer can be increased, causing the movement characteristic and durability of the magnetic recording medium to be improved.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described with reference to the drawings. It is preferable that a magnetic recording medium according to the present invention is an original material for manufacturing magnetic discs by punching the original material into disc shapes. The magnetic recording medium according to the present invention may be as it is employed as an original material for manufacturing a magnetic tape. When the magnetic recording medium according to the present invention is employed as the original material for manufacturing the magnetic tape, the magnetic recording medium according to the present invention has a magnetic layer formed on one of the main surfaces of the non-magnetic support member.

Figure 1:
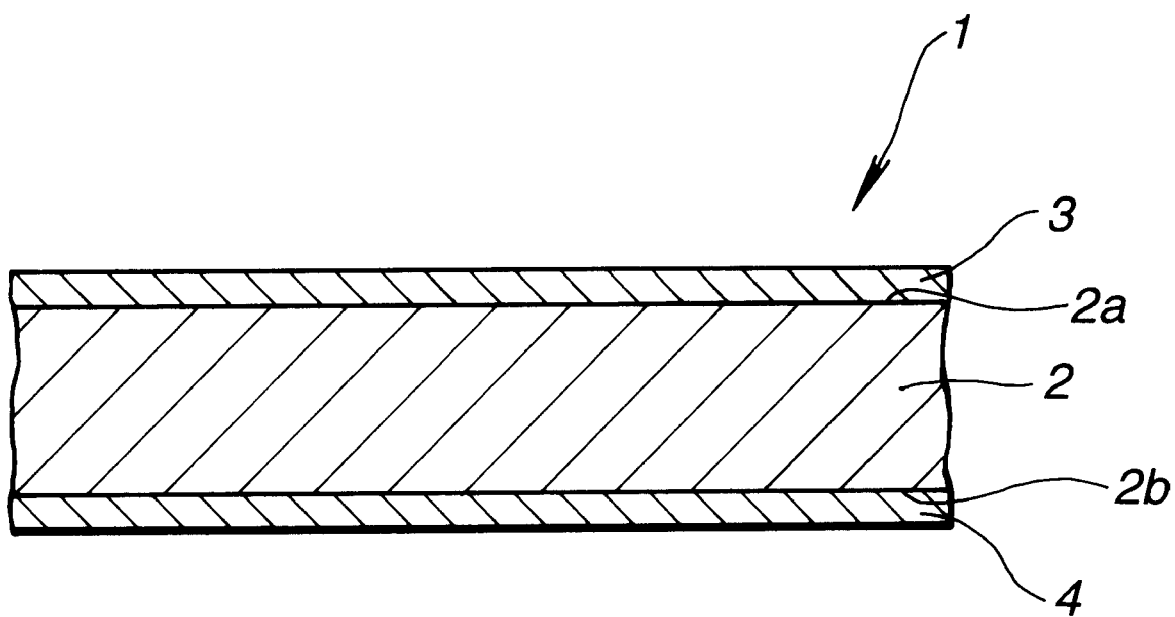
FIG. 1 is a cross sectional view showing an example of a magnetic recording medium according to the present invention.

A magnetic recording medium 1 according to the present invention shown in FIG. 1 is used as an original material for manufacturing magnetic discs, more particularly for manufacturing flexible discs.

The magnetic recording medium 1 according to the present invention incorporates an elongated non-magnetic support member 2 having first and second main surfaces 2a and 2b on which magnetic layers 3 and 4 are formed.

When a magnetic disc is manufactured from the magnetic recording medium 1, the magnetic recording medium 1 is punched into a disc shape. Then, heat treatment is performed to enhance reactions of a polymer martial and crosslinking material in the magnetic layers 3 and 4. Thus, the magnetic disc can be manufactured. The non-magnetic support member 2 of the magnetic recording medium 1 according to the present invention is made of a biaxially-oriented polyethylene terephthalate film. Polyethylene terephthalate for forming the foregoing film is a polymer, a copolymer or a mixture having a structure that 90 mol % or higher portion of the molecular structure is composed of ethylene terephthalate units. It is preferable that the melting point of the foregoing polymer is 250° C. or higher, more preferably 255° C. or higher. It is preferable that the specific viscosity of the polymer is 0.4 to 1.0, more preferably 0.55 to 0.8.

The biaxially-oriented polyethylene terephthalate film is obtained by melting and extruding polyethylene terephthalate by a die. Then, the extruded material is drawn in two axial directions.

The polyethylene terephthalate film can be drawn into two axial directions (hereinafter called "drawn biaxially") so as to be biaxially oriented by the following method.

A known drawing apparatus is operated to heat non-drawn polyethylene terephthalate film to a temperature range higher than the glass transition point thereof, that is, 90° C. to 150° C. Then, simultaneous biaxial drawing method or a sequential biaxial drawing method is employed to draw the film in the lengthwise direction and the widthwise direction. At this time, the non-drawn polyethylene terephthalate film is drawn in the lengthwise direction and the widthwise direction about two times to about five times, preferably 3 times to 4.5 times. That is, it is preferable that the magnification of a drawn area is 4 times to 25 times, more preferably 9 times to 20 times.

As an alternative to the biaxial and two-step drawing method, a method having three or more drawing steps may be employed. It is preferable that the polyethylene terephthalate film is a balance type film.

The drawn polyethylene terephthalate film is fixed with heat so as to be biaxially oriented. As a method of fixing polyethylene terephthalate with heat, a known stenter or a heat roll may be employed. In particular, it is preferable that a stenter is employed to fix the polyethylene terephthalate with heat in an industrial view point. It is preferable that the heat-fixing temperature is higher than the foregoing drawing temperature by 40° C. or more and lower than the melting point of the polyethylene terephthalate by 20° C. That is, it is preferable that the temperature is 180° C. to 240° C. The heat-fixing temperature is a highest temperature in the heat fixing process or temperatures in a zone for the heat fixing process. As an alternative to this, the heat treatment may be performed in a state in which four sides of the film under a tension or in a loosen state are held.

As described above, the polyethylene terephthalate film is drawn biaxially so that the polyethylene terephthalate is biaxially oriented.

The non-magnetic support member 2 must be obtained in which deformation, for example, a curl, in a specific direction can satisfactorily be prevented. The deformation must be prevented even after preservation, after the heat fixing process and/or after heat treatment to be described later and arranged for the purpose of enhancing reactions of the polymer martial and the crosslinking material in the magnetic layers 3 and 4. To prevent the foregoing deformation, the physical properties of the biaxially-oriented non-magnetic support member 2 must be substantially uniform at an arbitrary position, in particular, in all directions on the main surfaces 2a and 2b.

To achieve this, the difference in the refractive index of the first main surface 2a and that of the second main surface 2b of the biaxially-oriented non-magnetic support member 2 in the same direction must be minimized. In this case, it can be said that the non-magnetic support member 2 has uniform physical properties.

That is, if the refractive index of the non-magnetic support member is different excessively between the first main surface and the second main surface, the physical properties of the two main surfaces of the non-magnetic support member are different from each other. When the non-magnetic support member is subjected to the heat treatment, the physical properties including the coefficient of thermal contraction of the first main surface and the second main surface of the non-magnetic support member are excessively different from each other. In the foregoing case, the non-magnetic support member is deformed in a specific direction.

Therefore, the magnetic recording medium 1 according to the present invention has a structure that the difference $n_1$ of the refractive index between the first main surface 2a and the second main surface 2b of the non-magnetic support member 2 composed of the biaxially-oriented polyethylene terephthalate film is $1 \times 10^{-3}$ or smaller. Note that the first main surface 2a and the second main surface 2b of the non-magnetic support member 2 are the first main surface and the second main surface at the same position of the non-magnetic support member 2.

That is, an assumption is made that the refractive index of the first main surface 2a at a certain position of the biaxially-oriented polyethylene terephthalate film is $n_1$ and the refractive index of the second main surface 2b at the same position is $n_2$. The difference $\Delta n_1$ between the refractive indexes satisfies the following equation:

$$\Delta n_1 = |n_1 - n_2| \leq 1 \times 10^{-3}$$

As described above, the magnetic recording medium 1 according to the present invention has the structure that the difference between the refractive index of the first main surface 2a and that of the second main surface 2b of the non-magnetic support member 2 can be minimized. Therefore, the physical properties of the overall body of the non-magnetic support member 2 can satisfactorily be uniformed. It leads to a fact that the magnetic recording medium 1 according to the present invention is able to satisfactorily prevent deformation of the non-magnetic support member 2, such as a curl, in a specific direction. The deformation can be prevented even after the non-magnetic support member 2 has been subjected to the heat treatment and/or after the magnetic recording medium 1 has been preserved. As a result, the magnetic recording medium 1 according to the present invention is able to satisfactorily prevent the deformation. Thus, excellent contact with the magnetic head can be realized.

It is preferable that the thickness of the polyethylene terephthalate which is the non-magnetic support member 2 is 30 µm or greater, more specifically 30 µm to 100 µm, and most specifically 50 µm to 80 µm. It leads to a fact that the magnetic recording medium 1 according to the present invention has a structure that the ratio of the thickness of the non-magnetic support member 2 with respect to the overall thickness of the magnetic recording medium can be raised. Thus, the deformation of the magnetic recording medium is determined by dint of the shape of the non-magnetic support member 2. As a result, the magnetic recording medium 1 according to the present invention is able to furthermore effectively prevent deformation thereof.

As described above, the magnetic recording medium 1 according to the present invention has the structure that the difference in the refractive index between the two main surfaces of the non-magnetic support member 2 is minimized. Therefore, the difference in the physical properties between the two main surfaces of the non-magnetic support member 2 can be minimized. As a result, the overall body of the non-magnetic support member 2 has substantially uniform physical properties. Thus, the magnetic recording medium 1 according to the present invention is able to prevent deformation of its non-magnetic support member 2 in a specific direction. As a result, a magnetic recording medium which is able to furthermore effectively prevent deformation thereof and which has a satisfactory surface characteristic can be obtained.

As a result, the magnetic recording medium 1 according to the present invention can satisfactorily be brought into contact with the magnetic head. Therefore, the magnetic recording medium 1 can be used many times while an error including displacement of a track occurring when a recording/reproducing operation is performed can be prevented. As a result, excellent movement characteristic, durability, electromagnetic conversion characteristic and the recording/reproducing characteristic can be realized. Moreover, a high linear recording density can be realized.

It is preferable that the non-magnetic support member 2 of the magnetic recording medium 1 according to the present invention has a structure that difference $\Delta n_2$ between a maximum value and a minimum value of the refractive index in all directions of each of the main surfaces 2a and 2b thereof is $15 \times 10^{-3}$ or smaller. The difference $\Delta n_2$ can be adjusted by changing the drawing magnification in the lengthwise direction and the widthwise direction of the non-magnetic support member. It is preferable that the drawing magnification in the widthwise direction is higher than that in the lengthwise direction by 0.1 to 0.3 times.

As described above, the magnetic recording medium 1 according to the present invention has the structure that the difference $\Delta n_2$ between a maximum value and a minimum value of the refractive index of each main surface of the non-magnetic support member 2 is limited as described above. As a result, the main surfaces 2a and 2b of the non-magnetic support member 2 have substantially uniform and satisfactory surface characteristics. Therefore, the magnetic recording medium 1 according to the present invention is able to satisfactorily prevent local deformation of each of the main surfaces of the non-magnetic support member 2 even after the non-magnetic support member 2 has been subjected to the heat treatment and/or after the magnetic recording medium 1 has been preserved. Thus, a magnetic recording medium having an excellent surface characteristics can be obtained. As a result, the magnetic recording medium 1 according to the present invention can satisfactorily be brought into contact with the magnetic head. Therefore, the magnetic recording medium 1 can be used many times while displacement of a track can be minimized.

The refractive indexes of the main surfaces 2a and 2b of the non-magnetic support member 2 can be adjusted by controlling distribution of temperatures of the polyethylene terephthalate film which is the non-magnetic support member 2. The control of the temperature distribution is performed when the drawing process is performed to manufacture the polyethylene terephthalate film. That is, the temperature distribution in the polyethylene terephthalate can be uniformed as much as possible when the drawing process is performed. Thus, the non-magnetic support member 2 having the structure that the difference in the refractive index between the two main surfaces 2a and 2b can be minimized can be manufactured.

The temperature distribution over the surface of the polyethylene terephthalate film which is in contact with a conveying roll and the temperature distribution over the surface of the same which is not in contact with the foregoing roll can easily made to be nonuniform during the drawing process. Therefore, the surface which is not in contact with the conveying roll is forcibly brown with hot air. As an alternative to this, the temperatures of the conveying roll are adjusted. Thus, the temperature distribution over the polyethylene terephthalate film can satisfactorily be uniformed during the drawing process.

The principle of a method of measuring the refractive indexes of the two main surfaces of the non-magnetic support member will be described.

Figure 2:
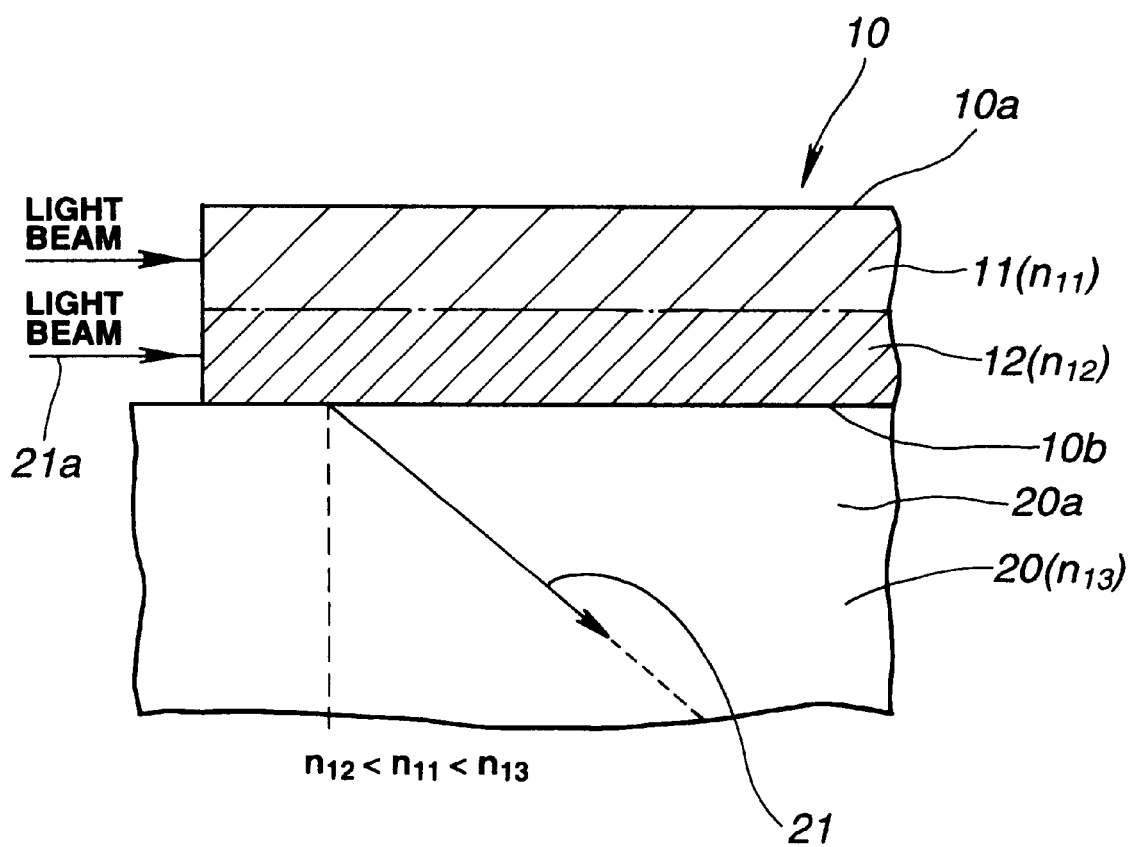
FIG. 2 is a cross sectional view showing a state in which a refractive index of either side of a non-magnetic support member is measured.
Figure 3:
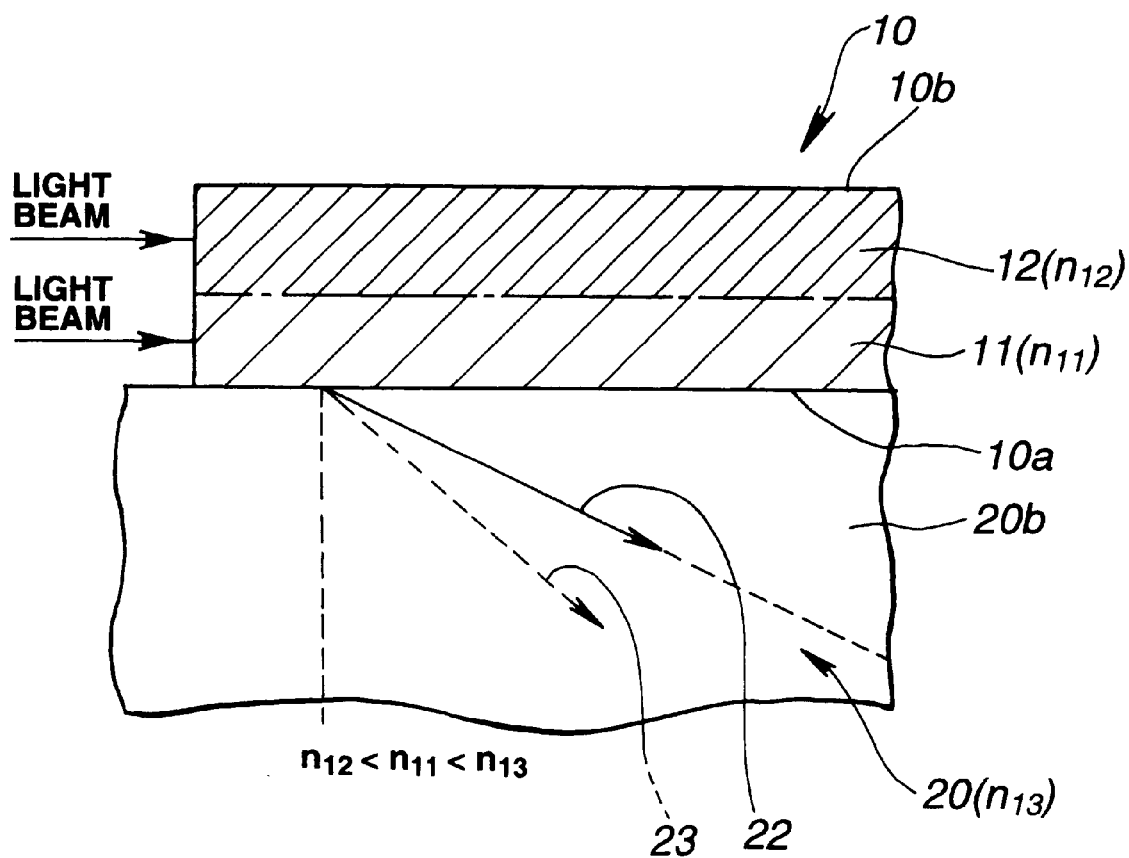
FIG. 3 is a cross sectional view showing a state in which the refractive index of the other side of the non-magnetic support member is measured.

When the refractive indexes of the two main surfaces of the non-magnetic support member are measured, an Abbe's refractometer manufactured by, for example, Atago is employed. The foregoing refractometer is employed to measure the refractive indexes of the two main surfaces 10a and 10b of the non-magnetic support member 10 in accordance with the foregoing principle. Note that a portion including the first main surface 10a of the non-magnetic support member 10 is called a first support member portion 11. Moreover, a portion including the second main surface 10b of the non-magnetic support member 10 is called a second support-member portion 12. FIGS. 2 and 3 are cross sectional views showing the principle for measuring the refractive indexes of the first main surface 10a and the second main surface 10b of the non-magnetic support member 10.

When the refractive indexes of the main surfaces 10a and 10b are measured by using the Abbe's refractometer, the non-magnetic support member 10, which must be measured, is placed on a measuring prism 20 joined to the foregoing refractometer. At this time, the non-magnetic support member 10 is disposed on the measuring prism 20 through appropriate contact solution.

The Abbe's refractometer is used to cause a light beam to be made incident on the magnetic recording medium 1. A light beam is detected among the light beams made incident on the measuring prism 20 through the non-magnetic support member 10 that causes a boundary between a bright portion and a dark portion to be formed in the measuring prism 20. Thus, the refractive index of a required surface is measured.

An assumption is made that the refractive index of the measuring prism 20 is $n_{13}$, the refractive index of the first support member portion 11 is $n_{11}$ and the refractive index of the second support-member portion 12 is $n_{12}$. If the relationships $n_{12}<n_{11}<n_{13}$ are satisfied, the refractive index $n_{13}$ of the measuring prism 20 is made to be 1.93, the refractive index $n_{11}$ of the first main surface 10a is made to be 1.70 and the refractive index $n_{12}$ of the second main surface 10b is made to be 1.50. Initially, the non-magnetic support member 10 is placed on the measuring prism 20 in such a manner that the second main surface 10b is brought into contact with the measuring prism 20, as shown in FIG. 2. Then, the non-magnetic support member 10 is irradiated with a light beam.

A light beam horizontally made incident on the first support member portion 11 having the high refractive index is totally reflected in the first support member portion 11. Thus, the foregoing light beam is not made incident on the second support-member portion 12 having the low refractive index. As a result, the foregoing light beam is not made incident on the measuring prism 20. Therefore, the foregoing light beam is not detected by the Abbe's refractometer.

On the other hand, a light beam 21a horizontally made incident on the second support-member portion 12 having the low refractive index is allowed to pass through the second support-member portion 12, as shown in FIG. 2. Then, the foregoing light beam 21a is made incident on the measuring prism 20 so as to be allowed to pass through the measuring prism 20. A light beam 21 allowed to pass through the measuring prism 20 forms the boundary between a bright portion and a dark portion in the measuring prism 20. As a result, a measuring prism 20a adjacent to the non-magnetic support member 10 as compared with the light beam 21 is darkened.

Finally, the light beam 21 is detected by the Abbe's refractometer. Note that the light beam each of which has been made incident on the first support member portion 11 and the second support-member portion 12 is omitted in FIG. 2.

The Abbe's refractometer is operated in a state in which the second main surface 10b of the two main surfaces of the non-magnetic support member 10 that has the lower refractive index is placed on the measuring prism 20 having the highest refractive index. Thus, the light beam 21 is detected which forms the boundary between a bright portion and a dark portion in the measuring prism 20. Therefore, the refractive index $n_{12}$ of the second main surface 10b of the two main surfaces of the non-magnetic support member 10 that has the lower refractive index can be measured.

On the other hand, the non-magnetic support member 10 is placed on the measuring prism 20 in such a manner that the first main surface 10a is brought into contact with the measuring prism 20, as shown in FIG. 3. Then, the non-magnetic support member 10 is irradiated with a light beam.

As a result, a light beam horizontally made incident on the first support member portion 11 having the high refractive index is made incident on the measuring prism 20 having a higher refractive index so as to be allowed to pass through the measuring prism 20, as shown in FIG. 3. The light beam 22 allowed to pass through the measuring prism 20 forms the boundary between a bright portion and a dark portion in the measuring prism 20. As a result, a measuring prism 20b adjacent to the non-magnetic support member 10 as compared with the light beam 22 is darkened.

Finally, the light beam 22 is detected by the Abbe's refractometer. Note that the light beams each of which has been made incident on the first support member portion 11 and the second support-member portion 12 are omitted in FIG. 3.

Therefore, the first main surface 10a of the two main surfaces of the non-magnetic support member 10 that has the higher refractive index is placed on the measuring prism 20 having the highest refractive index. Thus, the light beam 22 is detected which forms the boundary between a bright portion and a dark portion in the measuring prism 20. Therefore, the refractive index $n_{11}$ of the first main surface 10a of the non-magnetic support member 10 that has the higher refractive index can be detected.

In a state shown in FIG. 3, the light beam horizontally made incident on the second support-member portion 12 having the low refractive index is made incident on the magnetic recording medium 1 having the higher refractive index so as to be allowed to pass through the first support member portion 11. Then, as shown in FIG. 3, the light beam is made incident on the measuring prism 20 having a higher refractive index so as to be allowed to pass through the measuring prism 20, as shown in FIG. 3. However, the light beam 23 which is allowed to pass through the second support-member portion 12 and then allowed to pass through the first support member portion 11 cannot appear in the measuring prism 20 if the transmissivity of the first support member portion 11 is low. Therefore, the light beam cannot be received and the refractive index cannot be measured. Thus, detection of the light beam 23 is not a preferred method.

As described above, the Abbe's refractometer is operated in a state in which the main surfaces of the non-magnetic support member 10 are disposed on the measuring prism 20. Then, a measuring light beam is made incident on the non-magnetic support member 10 so as to detect the light beam made incident on the measuring prism 20. Thus, the refractive indexes $n_{11}$ and $n_{12}$ at the first main surface 10a and the second main surface 10b of the non-magnetic support member 10 can be measured.

The magnetic recording medium 1 according to the present invention has a structure that the coefficient of thermal contraction of the non-magnetic support member 2 constituted by the biaxially-oriented polyethylene terephthalate film at 80° C. is 0.1% or lower. As a result, deformation of the non-magnetic support member in a specific direction after the non-magnetic support member 2 has been subjected to the heat treatment can be minimized. Thus, the magnetic recording medium according to the present invention is able to prevent deformation thereof. As a result, change in the contact with the magnetic head can be minimized. As a result, the magnetic recording medium can be used many times while satisfactory movement characteristic, durability and recording/reproducing characteristic are realized because an error including displacement of a track during a recording/reproducing operation can be prevented.

When the non-magnetic support member 2 is used, thermosetting polyisocyanate serving as the crosslinking compound may be contained in the magnetic layers 2 and 3. The reason for this lies in that the non-magnetic support member 2 is able to withstand the heat treatment temperature of, for example, 50° C. to 90° C. which is sufficiently high to enhance the crosslinking reactions of the crosslinking compound and the heat treatment duration. Thus, the strengths of the magnetic layers 3 and 4 can be increased. As a result, the movement characteristic and the durability of the magnetic recording medium 1 can be improved.

The coefficient of thermal contraction of the non-magnetic support member can be adjusted by adjusting the heat fixing temperature or by performing a relaxing process after the heat fixing process has been performed. The relaxing process which is performed after the heat fixing process has been performed is performed as follows: the polyethylene terephthalate film biaxially drawn and fixed with heat is set to a stenter so as to be drawn in the widthwise direction at a low ratio, in particular, at 0% to 4%. In the foregoing state, the polyethylene terephthalate film is heated at a temperature lower than the heat fixing temperature. Thus, the coefficient of thermal contraction can be reduced.

The surface roughness of the non-magnetic support member 2 of the magnetic recording medium 1 according to the present invention must be such that the average roughness Ra along the center line is 7 nm or lower, preferably 2 nm to 7 nm. If the surface roughness of the non-magnetic support member is greater than 7 nm, an adverse influence is exerted upon the roughness of the magnetic layer. In this case, an excessively spacing loss is produced and the electromagnetic conversion characteristic deteriorates. As a result, the error rate is raised excessively. What is worse, the magnetic layer is excessively worn after the magnetic recording medium has been used many times. If the surface roughness of the non-magnetic support member is lower than 2 nm, the non-magnetic support member films can easily be allowed to adhere to each other during a winding process around the roll in the coating step or the like. As a result, easy handling is inhibited.

The surface roughness of the polyethylene terephthalate which is the non-magnetic support member 2 can be adjusted by a method in which inactive solid particles are contained in polyethylene terephthalate polymers. A surface treatment method may be employed in which a film in which inactive solid particles are dispersed is formed on each of the two sides of the polyethylene terephthalate film.

The inactive particles may be made of silicon dioxide (including hydrate, silicate soil, silica sand and quarts); alumina; silicate containing $SiO_2$ components by 30 wt % or more (for example, amorphous or crystalline clay mineral, aluminosilicate (including calcined material and hydrate), chrysotile zircon, fly ash or the like); oxide of Mg, Zn, Zr or Tl; sulfate of Ca or Ba; phosphate of Li, Na or Ca (including monohydric salt or dihydric salt); benzoate of Li, Na or K; terephthalate of Ca, Ba, Zn or Mn; titanate of Mg, Ca, Ba, Zn, Cd, Pb, Sr, Mn, Fe, Ce or Ni, chromate of Ba or Pb; carbon (for example, carbon black, graphite or the like); glass (for example, glass powder or glass beads), carbonate of Ca or Mg; fluorite; or ZnS.

More preferably, the inactive particles may be made of silicic anhydride; silicon hydrate; aluminum oxide; aluminate silicate (including calcined material and hydrate); monolithium phosphate; trilithium phosphate; sodium phosphate; calcium phosphate; barium sulfate; titanium oxide; lithium benzoate; double salt of any one of the foregoing compounds (including hydrate); glass powder; clay (including kaoline, bentonite and clay); talc, silicon soil; or calcium carbonate.

It is preferable that the average particle size of the inactive solid particles is 0.05 $\mu$m to 0.7 $\mu$m, more preferably 0.08 $\mu$m to 0.4 $\mu$m. It is preferable that the quantity of addition of the inactive solid particles is 0.005 wt % to 1.5 wt %, more preferably 0.01 wt % to 1.0 wt %.

The polyethylene terephthalate which is the non-magnetic support member 2 may be subjected to an adhesion facilitating process for the purpose of increasing the strength of adhesive bonding of the applied magnetic layer.

The magnetic layers 3 and 4 which are formed on the first and second main surfaces 2a and 2b of the non-magnetic support member 2 having the above-mentioned structure contain at least ferromagnetic powder and a polymer material. It is preferable that the thickness of each of the magnetic layers 3 and 4 is 2.0 $\mu$m or smaller, more preferably 1.5 $\mu$m or smaller.

The ferromagnetic powder which is contained in the magnetic layers 3 and 4 is exemplified by a ferromagnetic material, such as $\gamma\text{-}Fe_2O_3$, $\gamma\text{-}Fe_2O_3$ containing Co, $Fe_3O_4$, $Fe_3O_4$ containing Co, $CrO_2$, Co—Ni—P alloy, Co—Ni—Fe alloy, Co—Cr alloy, Co—Ni alloy and barium ferrite. The surface of the employed ferromagnetic powder may be impregnated with a dispersant, a lubricant a charge preventive material or the like to be described later which are adsorbed prior to performing the dispersing process.

The polymer material which is contained together with the ferromagnetic powder may be thermoplastic resin, thermosetting resin, reactive resin and their mixtures.

The thermoplastic resin is resin having a setting temperature of, for example, 150° C. or lower, an average molecular weight of 10,000 to 300,000 and a degree of polymerization is about 50 to about 2,000. The thermoplastic resin may be any one of the following materials: vinyl chloride-vinyl acetate copolymer; vinyl chloride-vinylidene copolymer; vinyl chloride-acrylonitrile copolymer; acrylic ester-acrylonitrile copolymer; acrylic ester-vinylidene chloride copolymer; acrylic ester-styrene copolymer; methacrylate-acrylonitrile copolymer; methacrylate-vinylidene chloride copolymer; methacrylate-styrene copolymer; urethane elastomer; nylon-silicon resin; nitrocellulose-polyamide resin; polyvinyl fluoride; vinylidene chloride-acrylonitrile copolymer; butadiene-acrylonitrile copolymer; polyamide resin; polyvinyl butyral; cellulose derivative (cellulose acetate butyrate, cellulose diacetate; cellulose triacetate; cellulose propionate; nitrocellulose or the like), styrene-butadiene copolymer; polyester resin; chlorovinyl ether-acrylate ester copolymer; amino resin; a variety of synthetic rubber thermoplastic resin and a mixture of any one of the foregoing materials.

The thermoplastic resin is resin having a glass transition temperature of −100° C. to 150° C., number average molecular weight of 1,000 to 200,000, preferably 10,000 to 100,000 and a degree of polarization of about 50 to about 1,000. The thermoplastic resin is exemplified by a polymer or a copolymer containing, as a component unit thereof, any one of the following materials: vinyl chloride, vinyl acetate, vinyl alcohol, maleic acid, acrylic acid, acrylate, vinylidene chloride, acrylonitrile, metacrylic acid, methacrylate, styrene, butadiene, ethylene, vinyl butyral, vinyl acetal, and vinyl ether; polyurethane resin; and a variety of rubber resin.

The thermoplastic resin or the reactive resin in a state of, for example, a coating solution, has a molecular weight of 200,000 or smaller. When the foregoing resin is heated after it has been applied or dried, the molecular weight is enlarged infinitely by dint of condensation, addition or the like. It is preferable that resin, which is not softened or melted during decomposition of the resin by dint of heat, is selected from a variety of resin materials of the foregoing type. Specifically, the foregoing resin may be any one of the following materials: phenol resin; epoxy resin; polyurethane setting resin; urea resin; melamine resin; alkyd resin; silicon resin, acrylic-type reactive resin; formaldehyde resin; silicon resin; epoxy-polyamide resin; nitrocellulose melamine resin; a mixture of polymer polyester resin and di-isocyanate prepolymer; a mixture of polyester polyol and polyisocyanate; a mixture of polyurethane and polyisocyante; urea formaldehyde resin; a mixture of low molecular-weight glycol, high molecular-weight diol and triphenylmethane triisocyanate: polyamide resin; and a mixture of the foregoing materials. As for the foregoing resin, refer to, for example, "PLASTIC HANDBOOK" published by Asakura.

The foregoing resin may be employed or combination is permitted. It is preferable that combination of at least one type of a material selected from a group consisting of vinyl chloride resin, vinyl chloride-vinyl acetate resin, vinyl chloride-vinyl acetate-alcohol resin and vinyl chloride-vinyl acetate-maleic anhydride copolymer and polyurethane resin. As an alternative to this, combination formed by adding polyisocyanate to the foregoing combination. The structure of the polyurethane resin may be any one of known materials below: polyester-polyurethane, polyether-polyurethane, polyether-polyester-polyurethane, polycarbonate-polyurethane, polyester-polycarbonate-polyurethane, polycaprolactone-polyurethane and polyolefin-polyurethane. To obtain further satisfactory dispersion characteristic and durability with the foregoing polymer materials, at least one type of a polar group is introduced by copolymerization or addition reactions. The polar group is selected from a group consisting of —COOM, —SO$_3$M, —OSO$_3$M, —P=O(OM)$_2$, —O—P=O (OM)$_2$ (where M is a hydrogen atom or an alkali metal group), —OH, —NR$_2$, —H+R$_3$ (where R is a hydrocarbon group), an epoxy group, —SH, —CN, sulfobetaine, phosphobetaine and carboxybetaine. The quantity of the polar group is $10^{-1}$ mol/g to $10^{-8}$ mol/g, preferably $10^{-2}$ mol/g to $10^{-6}$ mol/g.

Moreover, an additive may be added. The mixing ratio of the ferromagnetic powder and the polymer material which are contained in the magnetic layers 3 and 4 is such that 12 parts by weight to 50 parts by weight of the polymer material is contained with respect to 100 parts by weight of the ferromagnetic powder.

It is preferable the foregoing thermoplastic resin, the thermosetting resin and the reactive resin contain any one of the following functional group in addition to the main functional group. That is, the functional group is exemplified by an amphoteric group, such as carboxylic acid, sulfinic acid, sulfonic acid, phosphoric acid, a sulphate group or a phosphate group; amino acid, such as sulphate or phosphate, of aminosulfonic acid or amino alcohol, an amphoteric group, such as alkylbetaine, a hydroxyl group, alkoxyl group, thiol group, a halogen group, a silyl group, a siloxane group, such as an amino group, an imino group, an imide group and an amide group.

As a crosslinking material for the foregoing polymer material, a crosslinking compound, such as polyisocyanate, may be added to the polymer material resin. The magnetic recording medium 1 according to the present invention is structured in such a manner that deformation of the non-magnetic support member 2 occurring by dint of the heat treatment is minimized. Therefore, when the foregoing crosslinking compound is added as the polymer resin component in the magnetic layers 3 and 4, the magnetic recording medium 1 is free from excessive deformation even if the heat treatment temperature and heat treatment duration with which the crosslinking reactions of the polymer material resin can sufficiently be enhanced are set. As a result, the crosslinking reactions can efficiently be performed. As a result, the magnetic recording medium 1 incorporates the magnetic layers 3 and 4 which have sufficiently increased strengths as the films. As a result, an excellent movement characteristic can be realized when the magnetic recording medium 1 is operated in a disc drive.

Polyisocyanate is exemplified by isocyanate, such as tolylenediisocyanate, 4,4'-diphenylmethanediisocyanate, hexamethylenediisocyanate, xylylenediisocyanate, naphthylene-1, 5-diisocyanate, O-toluidinediisocyanate, isophoronediisocyanate or triphenylmethanetriisocyanate; a product of the foregoing isocyanate and polyalcohol; and polyisocyanate prepared by condensation of isocyanate. Merchantable isocyanate is as follows: Colonate L, Colonate HL, Colonate 2030, Colonate 2031, Millionate MR and Millionate MTL manufactured by Nihon Polyurethane; Takenate D-102, Takenate D-110N, Takenate D-200 and Takenate D-201 manufactured by Takeda, Dismodule L, Dismodule IL, Dismodule N and Dismodule HL manufactured by Sumitomo. Any one of the foregoing materials or two or more materials may be combined by using the deformation in the setting reactivity so as to be employed to form the non-magnetic layer and the magnetic layer.

When polyisocyanate is employed, the non-magnetic support member 2 has the coefficient of thermal contraction of 0.1% or lower at 80° C. Thus, the non-magnetic support member 2 is able to withstand the heat treatment temperature of, for example, 50° C. to 90° C. and duration which are sufficient to enhance the crosslinking reactions of the crosslinking compound. Therefore, the strengths of the magnetic layers 3 and 4 can be increased, causing the movement characteristic and the durability to be improved.

The additives which are contained in the magnetic layers 3 and 4 may be dispersant, lubricant and/or abrasive. The lubricant may be silicon oil, graphite, molybdenum disulfide, boron nitride, graphite fluoride, alcohol fluoride or polyolefine such as polyethylene wax, polyglycol such as polyethylene oxidowax, alkylphosphate, polyphenylether, tungsten disulfide, fatty acid ester composed of monobasic fatty acid having 10 to 20 carbon atoms and one or more alcohols selected from monohydric alcohol, dihydric alcohol, trihydric alcohol, tetrahydric alcohol and hexahydric alcohol or fatty acid ester composed of monobasic fatty acid having 10 or more carbon atoms and any one of mono- to hexahydric alcohols having 11 to 28 carbon atoms which is the total of the number of carbon atoms of the monobasic fatty acid and the number of carbon atoms thereof. Also fatty acid having 8 to 22 carbon atoms, fatty acid amide or fatty alcohol may be employed. The foregoing lubricant made of an organic compound is exemplified by butyl caprylic acid, octyl caprylic acid, ethyl lauric acid, butyl lauric acid, octyl lauric acid, ethyl myristic acid, butyl myristic acid, octyl myristic acid, ethyl palmitic acid, butyl palmitic acid, octyl palmitic acid, ethyl stearate, butyl stearate, octyl stearate, amyl stearate, anhydrosorbitan cenostearate, anhydrosorbitan distearate, anhydrosorbitan tristearate, anydrosorbitan tetrastearate, oleyl oleate, oleyl alcohol and lauryl alcohol. Moreover, a so-called lubricating oil additive may solely be employed. For example, any one of the following materials may be employed: an antioxidant, such as alkylphenol, an anticorrosive such as naphthenic acid, alkenyl succinic acid or dilaurylphosphate, an oilness agent such as rapeseed oil or lauryl alcohol, extreme pressure agent such as dibenzylsulfide, tricresyl phosphate or tributyl phosphate, detergent dispersant, viscosity index improver, pour point depressant and an antifoaming agent. It is preferable that the lubricant is added by 0.05 parts by weight to 20 parts by weight with respect to 100 parts by weight of the polymer material.

The dispersant which is contained in the magnetic layers 3 and 4 may be fatty acid having 10 to 22 carbon atoms and exemplified by capric acid, caprylic acid, lauric acid, myristic acid, palmitic acid, stearic acid, oleic acid, elaidic acid, linoleic acid, linolenic acid and stearolic acid, i.e., so-called $R_1$COOH (wherein $R_1$ is alkyl group having 9 to 21 carbon atoms). Moreover, alkali metal such as Li, Na or K of the foregoing fatty acid or alkaline earth metal such as Mg, Ca or Ba, metallic soap composed of Cu and/or Pb or lecithin may be employed. As an alternative to this, higher alcohol having four more carbon atoms, for example, butanol, octyl alcohol, mistylalcohol, stearyl alcohol, their sulfate or phosphate may be employed.

It is preferable that the dispersant is added by 0.005 parts by weight to 20 parts by weight with respect to 100 parts by weight of the polymer material. The dispersant may previously be applied to the surface of the ferromagnetic powder or non-magnetic fine powder. As an alternative to this, the dispersant may be added during the dispersing process.

The antistatic agent which is contained in the magnetic layers 3 and 4 may be any one of the following amphoteric surface active agent: conductive powder made of graphite, carbon black or carbon black polymer, a natural surface active agent such as saponin, a nonion surface active agent of alkylene oxide type, glycerine type, glycidol type, polyhydric alcohol, polyhydric alcohol ester or alkylphenol added with EO, a heterocyclic compound, such as polyhydric alkylamine, cyclic amine, hydantoin derivative, amidoamine, ester amide, quaternary ammonium salt or pyridine, a cation surface active agent such as phosphonium or sulfonium, an anion surface active agent containing an acidic group, such as carboxylic acid, sulfonic acid, phosphoric acid, sulfate or phosphate, amino acid, amino sulfonic acid, sulfate or phosphate of aminoalcohol or alkylbetaine. The quantity of the surface active agent is 0.01 parts by weight to 10 parts by weight with respect to 100 parts by weight of ferromagnetic powder. Although the foregoing material is employed as the surface active agent, it is sometimes employed to meet another purpose of improving the dispersing characteristic, the magnetic characteristic and/or the lubricating characteristic or to serve as an coating assistant.

As the carbon black which is added to the magnetic layers 3 and 4 may be furnace for rubber, thermal for rubber, black for color or acetylene black. The foregoing carbon black materials are given abbreviated names in U.S as SAF, ISAF, IISAF, T, HAF, SPF, FF, FFF, HMF, GPF, APF, SRF, MPF, ECF, SCF, CF, FT, MT, HCC, HCF, MCF, LFF or RCF. The carbon black may be a material classified in D-1765-82a, ASTM, U.S. The carbon black has an average particle size of 5 milli $\mu$m to 1000 milli $\mu$m (electron microscope), a specific surface area of 1 m$^2$/g to 800 m$^2$/g by a nitrogen adsorption method, pH of 4 to 11 (JIS K-6221-1982) and a dibutyl phthalate (DBP) oil absorption of 10 ml/100 g to 800 ml/100 g (JIS K-6221-1982).

The size of the carbon black for use in the magnetic layers 3 and 4 will now be described. When carbon black is employed to reduce the electric resistance of the surface of the applied magnetic layer, it is preferable that the size of carbon black is 5 nm to 100 nm. When carbon black is employed to control the strength of the applied magnetic layer, it is preferable that the size is 50 nm to 1000 nm. When the carbon black is added for the purpose of controlling the surface roughness of the applied magnetic layer, that is, when the carbon black is added to smooth and flatten the applied magnetic layer for the purpose of reducing a spacing loss, it is preferable that finer carbon black having an average particle size of, for example, 100 nm or smaller is employed. When carbon black is added for the purpose of roughing the surface of the applied magnetic layer so as to reduce the coefficient of friction, it is preferable that a further fine carbon black having an average particle size of, for example, 50 nm is employed. The type and the quantity of addition of carbon black are determined to meet the purpose of using the magnetic recording medium.

The foregoing carbon black may be subjected to surface treatment with a dispersant or formed into a graft structure by using resin. A material having a portion of the surface thereof which has been formed into a graphite structure may be employed by setting the temperature in the furnace to be 2000° C. or higher when carbon black is manufactured. Hollow carbon black, which is special carbon black, may be employed. It is preferable that carbon black is employed by 0.1 part by weight to 20 parts by weight with respect to 100 parts by weight of ferromagnetic powder. As for carbon black which may be employed in the present invention, refer to "Handbook of Carbon Black" edited by Carbon Black association (1971).

The polisher which may be added to the magnetic layers 3 and 4 may be a usual material having a polishing effect or a burnishing effect. For example, one to four types of the following materials having Moh's hardness of 6 or greater are employed: $\alpha$-alumina, molten alumina, silicon carbide, chrome oxide, cerium oxide, corundum, synthetic diamond, $\alpha$-iron oxide, garnet, emery mainly composed of corundum and magnetite, fluorite, silicon nitride, molybdenum carbide, boron carbide, tungsten carbide, titanium carbide, tripoli, diatomaceous earth and dolomite. The average particle size of the polisher is 0.005 $\mu$m to 5 $\mu$m, more preferably 0.05 $\mu$m to 2 $\mu$m. It is preferable that the polisher is added by 0.01 parts by weight to 20 parts by weight with respect to 100 parts by weight of the polymer material.

The method of kneading the polisher in the magnetic layers 3 and 4 is not limited to a specific method. The adding order of the components may arbitrarily be determined. The magnetic coating material and the coating material for forming the backcoat layer may be prepared by using a usual kneader, for example, a double roll mill, a triple roll mill, a ball mill (BALL), a pebble mill (PEBBLE), a thoron mill, a sandgrinder, a Szegvari (Szegvari), an attrizer (ATTRITOR), a Rotomill (Rotomill), a high shear impeller (HIGH SHEAR IMPELLER), a dispersing machine, a high speed stone mill, a high speed impact mill, a disperser (DISPERSER), a kneader, a kneader extruder, a high speed mixer, a planetary mixer, a ribbon blender, a kneader, an intensive mixer, a tumbler, a blender, a disperser, homogenizer, monoaxial screw extruder, a two-axle extruder and an ultrasonic dispersing machine.

The organic solvent is employed to perform dispersion, kneading and coating when the magnetic coating material solution which is the material for the magnetic layers 3 and 4 is prepared. Any one of the following organic solvent may be employed at an arbitrary ratio: ketone such as acetone, methylethylketone, methylisobutylketone, cyclohexane, isophorone or tetrahydrofuran; alcohol such as methanol, ethanol, propanol, butanol, isobutyl alcohol, isopropyl alcohol or methylcyclohexanol; ester such as methyl acetate, ethyl acetate, butyl acetate, isobutyl acetate, isopropyl acetate, ethyl lactate or glycol monoethyl ether acetate; ether such as diethylether, tetrahydrofuran, glycol dimethylether, glycol monoethyl ether or dioxane, tar (aromatic hydrocarbon) such as benzene, toluene, xylene, cresol, chlorobenzene or styrene; chlorinated hydrocarbon such as methylene chloride, ethylene chloride, carbon tetrachloride, chloroform or ethylene chlorohydrine, dichlorobenzene; N,N-dimethlformaldehyde; or hexane.

A non-magnetic intermediate layer may be formed between the magnetic layers 3 and 4 and the non-magnetic support member 2 to prevent electrification.

The magnetic recording medium 1 having the above-mentioned structure and according to the present invention and a magnetic disc which is obtained from the magnetic recording medium 1 are manufactured by the following processes.

Initially, the inactive solid particles are dispersed in polyethylene terephthalate polymer, and then melted and extruded from a die by a usual method. Thus, non-drawn polyethylene terephthalate film is manufactured.

The polyethylene terephthalate film is drawn biaxially, that is, in the lengthwise direction and the widthwise direction, as described above. Then, a stenter method is employed to fix the polyethylene terephthalate film with heat so that the film is oriented biaxially. At this time, for example, a method is employed in which the surface of the non-magnetic support member 2 which is not in contact with the conveying roll is blown with hot air during the drawing process. Thus, the temperature distribution over the non-magnetic support member 2 is uniformed maximally.

Also the coefficient of thermal contraction of the non-magnetic support member can be adjusted by adjusting the heat fixing temperature or by performing a relaxing process after the heat fixing process has been performed.

The polyethylene terephthalate film, which is the non-magnetic support member 2, may be subjected to a corona discharge process, a plasma process, an undercoating process, heat treatment, a dust removable process, a metal evaporation process and an alkali process, before the polyethylene terephthalate film is coated with the magnetic coating material.

Then, the two main surfaces of the polyethylene terephthalate film oriented biaxially and caused to have a requited surface roughness and coefficient of thermal contraction are coated with the magnetic coating material made of ferromagnetic powder and the polymer material. Thus, the magnetic layers 3 and 4 are formed. The magnetic layers 3 and 4 are formed by coating by an air doctor coat method, a blade coat method, an air knife coat method, a squeeze coat method, an impregnation coat method, a reverse roll coat method, a transfer roll coat method, a gravure coat method, a kiss coat method, a cast coat method or a spray coat method. The foregoing methods are specifically disclosed in "Coating Engineering", published by Asakura, pp. 253 to pp. 277 (Mar. 20, 1971).

The magnetic layers 3 and 4 applied to the two main surfaces 2a and 2b of the non-magnetic support member 2 in the form of the polyethylene terephthalate film by the foregoing method are subjected to a process in which magnetic powder in the magnetic layers are oriented while magnetic powder is being immediately dried, if necessary. Then, the formed magnetic layers 3 and 4 are dried so that the magnetic recording medium 1 according to the present invention is manufactured. The non-magnetic support member 2 is usually conveyed at speed of 10 m/minute to 1000 m/minute, while the drying temperature is controlled to be 50° C. to 130° C. If necessary, a surface smoothing and flattening process, for example, a calender process may be performed.

The calender rolls for performing the calender process are plastic rolls having heat resistance and made of epoxy resin, polyimide, polyamide or polyimideamide. As an alternative to this, two metal rolls may be employed. It is preferable that the processing temperature is 70° C. to 120° C., more preferably 80° C. to 100° C. It is preferable that the linear pressure is 200 kg/cm to 500 kg/cm, preferably 300 kg/cm to 400 kg/cm or higher.

As for the conditions under which the heating process is performed, a temperature and duration which are sufficiently high and long for the resin and the crosslinking material in the magnetic layers to be hardened are determined.

Finally, the material is cut into a required shape, for example, a disc shape, and then the disc shape members are subjected to heat treatment for the purpose of enhancing the reactions of the polymer material and the crosslinking material in the magnetic layers 3 and 4. Thus, magnetic discs are manufactured. The foregoing heat treatment is performed under determined condition including the temperature and duration which permits resin and crosslinking material in the magnetic layers 3 and 4 to react sufficiently. Note that the heat treatment must be performed at a temperature high than the glass transition temperature of the polymer material in the magnetic layer and lower than the glass transition temperature of the non-magnetic support member. For example, it is preferable that the temperature is 50° C. to 80° C. and the duration is 5 hours to 100 hours.

The non-magnetic support member is a biaxially-oriented polyethylene terephthalate film structured such that the difference $\Delta n_1$ in the refractive index between the two main surfaces is $1 \times 10^{-3}$ or lower. Moreover, the thickness of the non-magnetic support member is 30 μm or larger and the coefficient of thermal contraction at 80° C. is 0.1% or lower. Thus, even if thermosetting polyisocyanate serving as a crosslinking compound is contained in the foregoing magnetic coating material, the non-magnetic support member is able to withstand the relatively high heat treatment temperature of, for example, 50° C. to 90° C. and the duration. Therefore, the temperature is determined to be 50° C. to 90° C. and the duration is determined to be 5 hours to 100 hours. When the temperature is set to be 70° C. to 90° C. and the duration is set to be 24 hours to 100 hours, furthermore strong magnetic layers can be formed.

The magnetic recording medium according to the present invention has a structure similar to that of the above-mentioned magnetic recording medium. Moreover, the magnetic layer of the magnetic recording medium has a laminate structure in which an upper layer and a lower layer are laminated. At least the upper layer is formed into a magnetic layer containing ferromagnetic powder and the polymer material. It is preferable that the foregoing magnetic recording medium has a lower layer which is formed into a non-magnetic layer mainly composed of non-magnetic powder and the polymer material.

Each of the magnetic layer and the non-magnetic layer may be formed into a single layer structure or a multilayer structure. Therefore, the quantities of the polymer material, those of the vinyl chloride resin, polyurethane resin, polyisocyanate and other resin materials in the polymer material may be changed. Moreover, the molecular weight of each of the resin materials for forming the above-mentioned layers, the quantity of the polar groups and the foregoing physical properties of the resin may be changed. As a matter of course, the foregoing change is permitted without departing from the scope of the present invention. A multiplicity of known techniques relating to the multilayer magnetic layer may be employed. For example, an intermediate layer (a magnetic layer or a non-magnetic layer) may be formed in addition to the upper layer (the magnetic layer) and the lower layer (the non-magnetic layer). When the quantity of the polymer material in each layer is changed, it is effective to enlarge the quantity of the polymer material in the magnetic layer in order to prevent abrasion of the surfaces of the magnetic layers. To realize satisfactory head touch with the magnetic head, a method may be employed in which the quantity of the polymer materials in the intermediate layer except for the magnetic layers is enlarged to cause the magnetic recording medium to have flexibility.

The magnetic layers may be formed by a method similar to that for forming the above-mentioned magnetic layers. The other layer, that is, the non-magnetic layer is a layer mainly composed of non-magnetic powder and the polymer material. When the lower layer which is a non-magnetic layer having a surface flatness and strong films is formed on the non-magnetic support member, the magnetic layer can be thinned as compared with the structure in which the upper layer which is the magnetic layer in the form of a single layer is directly formed on the non-magnetic support member.

Non-magnetic powder for use to the non-magnetic layer is represented by the following pigments: α-iron oxide, goethite and needle titanium oxide. The non-magnetic pigment may be subjected to surface treatment for the purpose of improving the dispersion characteristic, realizing electric conductivity and adjusting the light transmissivity.

The foregoing non-magnetic pigment may be employed together with the following pigment: for example, carbon black, in particular, carbon black formed into a structure shape, goethite, rutile type titanium dioxide, anatase-type titanium dioxide, tin oxide, tungsten oxide, silicon oxide, zinc oxide, chrome oxide, cerium oxide, titanium carbide, BN, α-alumina, β-alumina, γ-alumina, calcium sulfate, barium sulfate, molybdenum disulfide, magnesium carbonate, calcium carbonate, barium carbonate, strontium carbonate or barium titanate.

The polymer material which is employed in the non-magnetic layer may be the known thermoplastic resin, the thermosetting resin and the reactive resin employed in the foregoing magnetic layers.

To manufacture the magnetic recording medium having the multilayer magnetic layers, the magnetic coating material for forming the magnetic layers and the non-magnetic coating material for forming the non-magnetic layer are previously manufactured. Then, the non-magnetic coating material for forming the lower layer and the magnetic coating material for forming the upper layer are applied to either side of the non-magnetic support member by a superimposition method. Then, the applied coating materials are dried. Then, the magnetic coating material for forming the lower layer and the magnetic coating material for forming the upper layer are applied to the other surface of the non-magnetic support member by the superimposition method. Then, the applied coating material are dried. Then, the non-magnetic support member having the two sides on which the magnetic layers have been formed is subjected to a smoothing and flattening process, such as the calender process.

As an alternative to the foregoing manufacturing order, an order may be employed in which the coating of the one side, the drying process and the calender process are performed in this sequential order. Then, the coating process, the drying process and the calender process are performed in this sequential order.

As described above, the two types of the coating materials, that is, the magnetic coating material for the upper layer and that for the lower layer are applied in the superimposition manner. In this case, the layers are successively formed by coating and drying (a so-called wet-on-dry coating method) may be employed. As an alternative to this, a method (a so-called wet-on-wet coating method= simultaneous wet superimposition coating method) may be employed in which the magnetic layer is applied so as to be superimposed on the non-magnetic layer in a wet state because it has not been dried. Note that it is preferable that the wet-on-wet superimposition coating method, that is, the simultaneous wet superimposition coating method is employed to uniform the applied films, improve the adhesiveness between the upper and lower layers and realize satisfactory productivity.

EXAMPLES

Examples of the present invention will now be described.
[Experiment 1]
To evaluate influences of the refractive index of each main surface of the non-magnetic support member upon the magnetic recording medium, samples were manufactured by the following method.

Example 1

Initially, pellet in the form of polyethylene terephthalate polymer containing, by 0.05 wt %, silica having an average particle size of 0.1 μm was dried at 180° C. for three hours. The polymer pellet was, by a usual method, melted and extruded from a die so that a non-drawn film was manufactured.

Then, the non-drawn film was sequentially and biaxially drawn four times in the lengthwise direction at 100° C. and 4.2 times in the widthwise direction at 110° C. When the film was drawn in the lengthwise direction, the temperatures of the drawing rolls and the atmosphere are made to be the same.

The biaxially-drawn polyethylene terephthalate film was subjected to the heat fixing process by the stenter method at 200° C. Thus, a polyethylene terephthalate film was obtained which had average roughness Ra along the central line of 2 nm, a thickness of 70 μm and a width of 5 m.

Finally, the widthwise central portion of the polyethylene terephthalate film, a middle portion apart from the central portion for 1 m in the widthwise direction and an edge portion apart form the central portion for 2 m were cut in the lengthwise direction to have a width of 300 mm. Thus, samples A, B and C were obtained.

Example 2

A process similar to that according to Example 1 was performed except for polyethylene terephthalate polymer containing, by 0.3 wt %, silica having an average particle size of 0.1 μm being employed. Thus, a polyethylene terephthalate film having average roughness Ra along the central line of 7 nm, a thickness of 70 μm and a width of 5 m was obtained. Similarly to Example 1, central, each of the central, middle and the edge portions of the polyethylene terephthalate film was cut to have a width of 300 mm. Thus, samples D, E and F were obtained.

Example 3

A process similar to that according to Example 1 was performed except for the following factors that a polyethylene terephthalate polymer containing, by 0.4 wt %, silica having an average particle size of 0.1 μm was employed, the temperature adjustment during the drawing process was performed by only adjusting the atmospheric temperature and the drawing magnification in the widthwise direction was 4.5 times. Thus, a polyethylene terephthalate film having surface roughness of 8 nm, a thickness of 70 μm and a width of 5 m was obtained. Similarly to Example 1, the central portion, the middle portion and the edge portion of the polyethylene terephthalate film was cut to each have a width of 300 mm. Thus, samples G, H and I were obtained.

The refractive indexes of the main surfaces of manufactured samples A to I were measured by a method to be described later so as to measure difference $\Delta n_1$ in the refractive index between the two main surfaces, difference $\Delta n_2$ between a maximum value and a minimum value of the refractive index in the main surfaces and the surface roughness.

Measurement of Refractive Index

Sodium D-beam having a wavelength λ of 589 nm was employed as a light source. An Abbe's refractometer was operated to measure the refractive indexes. Mounting solution was methylene iodide. The measurement was performed in a state in which the temperature was set to be 25° C. and the humidity was set to be 65% RH.

Measurement of Difference $\Delta n_1$ in Refractive Index Between Right and Reverse Sides Samples for measuring the refractive indexes were obtained by cutting the polyethylene terephthalate film for each of the samples at positions of angular degrees of 0° to 160° at angular intervals of 20° with reference to the lengthwise direction of the polyethylene terephthalate film. Thus, the refractive indexes of the first main surface and the second main surface were measured so that the absolute value of the difference was obtained. A maximum value of the differences in the refractive indexes between the two main surfaces of the samples cut at 0° to 160° with reference to the lengthwise direction was made to be $\Delta n_1$.

Measurement of Difference in Refractive Index in the Surface

A molecular orientation meter MOA-5001A manufactured by Oji was employed so that the axis of orientation of the polyethylene terephthalate film for the samples was obtained. Then, the difference between the refractive index in the direction of the axis of orientation and the refractive index rotated from the foregoing direction by an angular degree of 90° was obtained. The obtained results were made to be $\Delta n_2$.

Measurement of Surface Roughness

A method conforming to JIS-B-0601 was employed to measure average roughness along the central line on the surface of each sample by using a tracer-type surface roughness meter. A amount of cutoff was made to be 0.25 mm and the length which must be measured was made to be 1 mm. Results were shown in Table 1.

TABLE 1

| Samples | $\Delta n_1$ | $\Delta n_2$ | Surface Roughness [μm] |
|---|---|---|---|
| A | $0.5 \times 10^{-3}$ | $10 \times 10^{-3}$ | 2 |
| B | $0.8 \times 10^{-3}$ | $15 \times 10^{-3}$ | 2 |
| C | $1.0 \times 10^{-3}$ | $18 \times 10^{-3}$ | 2 |
| D | $0.6 \times 10^{-3}$ | $9 \times 10^{-3}$ | 7 |
| E | $0.8 \times 10^{-3}$ | $14 \times 10^{-3}$ | 7 |
| F | $1.0 \times 10^{-3}$ | $18 \times 10^{-3}$ | 7 |
| G | $13.0 \times 10^{-3}$ | $14 \times 10^{-3}$ | 8 |
| H | $10.0 \times 10^{-3}$ | $20 \times 10^{-3}$ | 8 |
| I | $4.0 \times 10^{-3}$ | $25 \times 10^{-3}$ | 8 |

Example 4

The two main surfaces of samples A to I each of which was the polyethylene terephthalate film manufactured as described above were coated with the following magnetic coating materials so that magnetic layers were formed. The magnetic layers were subjected to the calender process so that a magnetic recording medium was obtained.

<Magnetic Coating Material>

Ferromagnetic Powder: Fe (specific surface area: 50 m²/g)    100 parts by weight -continued Polymer Material:

| | |
|---|---|
| vinyl chloride-vinyl acetate copolymer resin (VAGH manufactured by UCC) | 5 parts by weight |
| polyurethane (manufactured by Nihon Polyurethane) | 20 parts by weight |
| nitrocellulose resin | 5 parts by weight |
| isocyanate compound (coronate HL manufactured by Nihon Polyurethane) | 20 parts by weight |
| Additive: carbon black (average particle size: 0.5 μm) | 5 parts by weight |

Organic Solvent:

| | |
|---|---|
| toluene | 100 parts by weight |
| methylethylketone | 100 parts by weight |
| cyclohexane | 100 parts by weight |

Each of the magnetic recording mediums manufactured as described above was formed into a disc having a diameter of 3.5 inches by punching. Then, the discs were subjected to heat treatment at 70° C. for 48 hours. Finally, magnetic discs were obtained.

Magnetic discs manufactured by using samples A, B, C, D, E and F were made to be Example 1, Example 2, Example 3, Example 4, Example 5 and Example 6. Magnetic discs manufactured by using samples G, H and I were made to be Comparative Examples 1, Comparative Example 2 and Comparative Example 3.

The degree of deformation, durability and an amount of offtrack of each of the magnetic discs according to Examples 1 to 6 and Comparative Examples 1 to 3 were measured as follows.

Measurement of Amount of Deformation of Magnetic Discs

While each of the samples of the magnetic discs was being rotated, amount of deflection at the outermost portion was read so that the amount of deformation of each magnetic disc was measured.

Evaluation of Durability

A modified floppy disc drive FD-1135-D (Manufactured by Nihon Electric Co.) was operated so that the sample of each magnetic disc was rotated continuously at 1200 rpm. Then, the number of passes until the output was reduced to 80% of the initial value was measured.

Measurement of Amount of Offtrack

Information signals were recorded on the sample of each magnetic disc, and then the magnetic discs on each of which the recording operation was performed were allowed to stand at a temperature of 60° C. and a humidity of 80% RH for 72 hours. Then, a floppy disc drive obtained by modifying a floppy disc drive FD-1135-D (manufactured by Nihon Electric Co.) was operated so that the difference between a maximum value and a minimum value of the outputs at the outermost track was measured. The obtained values were made to be amounts of offtrack. Results were shown in Table 2.

TABLE 2

| | Samples | Amounts of Deformation of Magnetic Discs [mm] | Durability Against Movement (× 10,000 passes) | Amounts of Offtrack [%] |
|---|---|---|---|---|
| Example 1 | A | 0.1 | 3000 or more | 3 |
| Example 2 | B | 0.2 | 3000 or more | 6 |
| Example 3 | C | 0.3 | 3000 or more | 8 |
| Example 4 | D | 0.2 | 3000 or more | 3 |

TABLE 2-continued

| Samples | | Amounts of Deformation of Magnetic Discs [mm] | Durability Against Movement (× 10,000 passes) | Amounts of Offtrack [%] |
|---|---|---|---|---|
| Example 5 | E | 0.2 | 3000 or more | 5 |
| Example 6 | F | 0.3 | 3000 or more | 9 |
| Comparative Example 1 | G | 4.0 | damage occurred after 500 passes | 5 |
| Comparative Example 2 | H | 3.0 | damage occurred after 1000 passes | 12 |
| Comparative Example 3 | I | 2.5 | damage occurred after 1600 passes | 15 |

As a result of Tables 1 and 2, Examples 1 to 6 each of which was structured such that the difference $\Delta n_1$ between the refractive index of the first main surface and that of the second main surface of the non-magnetic support member was $1 \times 10^{-3}$ were able to reduce the amounts of deformation. Therefore, as compared with Comparative Examples 1 to 3, having the difference $\Delta n_1$ in the refractive index which did not satisfy the above-mentioned range, excellent durability against movement was obtained.

Examples 1, 2, 4 and 5 were structured such that the difference $\Delta n_2$ between the maximum value and the minimum value in the main surfaces of the non-magnetic support member was $15 \times 10^{-3}$ or smaller. The foregoing examples encountered considerably small amount of offtrack as compared with Comparative Examples 2 and 3.

Examples 1 to 6 having the structure that the surface roughness was 2 nm to 7 nm had superior durability against movement to that of Comparative Examples 1 to 3 which did not satisfy the foregoing surface roughness. Comparative Examples 1 to 3 having the surface roughness of 8 nm suffered from unsatisfactory durability against movement. That is, the surface of the magnetic disc of each sample was damaged when 5,000,000 passes were performed which was ⅙ of the passes for the examples.

The magnetic recording medium according to the present invention had the structure that the difference $\Delta n_1$ between the refractive indexes of the two main surfaces of the non-magnetic support member was made to be $1 \times 10^{-3}$ or smaller. As a result, deformation can be minimized.

Thus, the magnetic recording medium according to the present invention is able to realize uniform contact with the magnetic head. As a result, abrasion which takes place owning to the contact with the magnetic head can be minimized. Thus, the durability against movement can be improved. That is, a magnetic recording medium with which wear of the magnetic layer can be prevented even if the magnetic recording medium is used many times and thus the life can be elongated.

When a magnetic disc is manufactured from the magnetic recording medium according to the present invention, the amount of deformation of the magnetic disc can be minimized. Moreover, satisfactory contact with the magnetic head can be realized. Thus, wear of the magnetic layer of the magnetic disc can be minimized even if the magnetic disc is used many times. Thus, the magnetic disc can smoothly be rotated and reduction in the output can be prevented satisfactorily. As a result, a magnetic disc exhibiting a high quality and long life can be obtained because the magnetic disc can be used repeatedly.

The magnetic recording medium according to the present invention is able to minimize deformation and realize satisfactorily uniform contact with the magnetic head. Therefore, tracking mistakes can be decreased and the error rate can be reduced. As a result, a reliable recording/reproducing operation can be performed.

Moreover, the magnetic recording medium according to the present invention has the structure that the difference $\Delta n_2$ between the maximum value and the minimum value of the refractive indexes in each of the main surfaces is limited to $15 \times 10^{-3}$ or smaller. Therefore, also the physical properties in the surfaces can extremely be uniformed. Thus, offtrack can be prevented and the recording/reproducing characteristic can therefore be improved.

Since the magnetic recording medium according to the present invention is able to minimize deformation thereof, the gap from the magnetic head can be minimized to perform a high-density recording operation. Since the thickness of the magnetic layer is reduced in a predetermined range, a higher recording density can be realized.

[Experiment 2]

Influences of the coefficient of thermal contraction of the non-magnetic support member which were exerted on the magnetic recording medium were evaluated with samples manufactured as follows.

Example 1

Initially, pellet composed of polyethylene terephthalate polymer containing, by 0.05 wt %, silica having an average particle size of 0.1 µm was dried at 180° C. for 3 hours. Polymer pellet above was melted and extruded from a die by a usual method so that a non-drawn film was manufactured.

Then, the non-drawn film was sequentially drawn by four times in the lengthwise direction at 100° C. and by 4.2 times in the widthwise direction at 110° C. At this time, the lengthwise directional drawing operation was performed such that the temperature of the drawing rolls and the atmospheric temperature were the same.

Then, the biaxially-drawn polyethylene terephthalate film was subjected to a heat fixing process by employing the stenter method at 215° C. While limit contraction of 1.0% was being performed, heat treatment was performed at 180° C. Thus, a polyethylene terephthalate film having average roughness Ra along the central line of 2 nm and a thickness of 70 µm was obtained. The obtained film was made to be sample a.

Then, a polyethylene terephthalate film was manufactured similarly to sample a except for the limit contraction during the final heat treatment being changed to 0.5%. The obtained sample was made to be sample b.

Then, a polyethylene terephthalate film was manufactured similarly to sample a except for the heat fixing process being performed at 200° C. and the final heat treatment being omitted. The obtained film was made to be sample c.

The difference $\Delta n_1$ between the refractive indexes of the two main surfaces of the manufactured samples a to c and the surface roughness of the samples a to c were measured similarly to Experiment 1. In this experiment, also the coefficients of thermal contraction of samples a to c were measured by the following method.

Measurement of Coefficient of Thermal Contraction

Samples for measuring the coefficients of thermal contraction each having a width of 10 mm and a length of 200 mm were obtained by cutting the polyethylene terephthalate film at an angular degree from 0° to 160° at an angular intervals of 20° with reference to the lengthwise direction of the polyethylene terephthalate film for the samples. Then, an evaluating distance of 100 mm was marked. Then, change in the evaluating distance occurring when a load of 10 g was added was read to an order of 1/1000 mm by using a digital measuring unit manufactured by Free. Then, the samples were subjected to heat treatment at 80° C. for one hour. Then, change in the evaluating distance occurring when a load of 10 g was added to an order of 1/1000 mm. In accordance with the obtained results of change in the dimensions realized after the heat treatment, the coefficients of thermal contraction were obtained. A maximum value of the coefficients of thermal contraction of the samples obtained by cutting the polyethylene terephthalate film in an angular range from 0° to 160° with reference to the lengthwise direction of the polyethylene terephthalate film was obtained as the coefficient of thermal contraction.

The difference $\Delta n_1$ between the refractive indexes of the two main surfaces of the samples, the surface roughness and obtained coefficients of thermal contraction were collectively shown in Table 3.

TABLE 3

| Samples | $\Delta n_1$ [× 10$^{-3}$] | Coefficient of Thermal Contraction [%] | Surface Roughness [nm] |
|---|---|---|---|
| a | 0.5 | 0.05 | 2 |
| b | 1.0 | 0.1 | 2 |
| c | 1.0 | 0.3 | 2 |

Example 2

Then, the two main surfaces of sample a in the form of the manufactured polyethylene terephthalate film were coated with the following coating material so that magnetic layers were formed. Then, the magnetic layers were subjected to a calender process so that magnetic recording mediums were obtained.

<Magnetic Coating Material>

| | |
|---|---|
| Ferromagnetic Powder: Fe magnetic powder (specific surface area: 50 m$^2$/g) | 100 parts by weight |
| Polymer Material: | |
| Vinyl Chloride-Vinyl Acetate Copolymer Resin (VAGH manufactured by UCC) | 5 parts by weight |
| Polyurethane (manufactured by Nihon Polyurethane) | 20 parts by weight |
| Nitrocellulose Resin | 5 parts by weight |
| Isocyanate Compound (Coronate HL manufactured by Nihon Polyurethane) | 20 parts by weight |
| Additive: carbon black (average particle size: 0.5 μm) | 5 parts by weight |
| Organic Solvent: | |
| toluene | 100 parts by weight |
| methylethylketone | 100 parts by weight |
| cyclohexane | 100 parts by weight |

Each of the manufactured magnetic recording mediums was formed into a disc shape having a diameter of 3.5 inches. Then, the discs were subjected to heat treatment at 50° C. for 48 hours. Finally, magnetic discs were obtained. The obtained magnetic discs were those according to Example 7.

Then, magnetic discs were manufactured similarly to Example 7 except for the heat treatment temperatures being 70° C. and 90° C., respectively. The obtained magnetic discs were those according to Examples 8 and 9, respectively.

Magnetic discs were manufactured similarly to Examples 7 to 9 except for sample b being employed in place of sample a. The obtained magnetic discs were those according to Examples 10 to 12.

Moreover, magnetic discs were manufactured similarly to Example 7 except for the heating temperatures being 40° C. and 100° C., respectively. The obtained magnetic discs were those according to Examples 13 and 14.

Magnetic discs were manufactured similarly to Examples 7 to 9 except for sample c being employed in place of sample a for making a comparison. The obtained magnetic discs were those according to Comparative Examples 4 to 6.

Similarly to Experiment 1, the degree of deformation, durability and the amount of offtrack of each of the magnetic discs according to Examples 7 to 14 and Comparative Examples 4 to 6 were measured. Results were collectively shown in Table 4.

TABLE 4

| Samples | | Heat Treatment temperatures [° C.] | Amounts of Deformation of Magnetic Discs [mm] | Durability Against Movement [× 10,000 passes] | Amounts of Offtrack [%] |
|---|---|---|---|---|---|
| Example 7 | a | 50 | 0.05 | 5000 or more | 3 |
| Example 8 | a | 70 | 0.06 | 5000 or more | 3 |
| Example 9 | a | 90 | 0.1 | 5000 or more | 5 |
| Example 10 | b | 50 | 0.1 | 5000 or more | 5 |
| Example 11 | b | 70 | 0.5 | 5000 or more | 6 |
| Example 12 | b | 90 | 0.8 | 5000 or more | 8 |
| Example 13 | a | 40 | 0.03 | damaged after 4000 passes | 3 |
| Example 14 | a | 100 | 0.8 | 5000 or more | 8 |
| Comparative Example 4 | c | 50 | 0.4 | damaged after 3500 passes | 8 |
| Comparative Example 5 | c | 70 | 1.0 | damaged after 3000 passes | 10 |
| Comparative Example 6 | c | 90 | 2.0 | damaged after 2000 passes | 12 |

Example 3

The two main surfaces of sample a in the form of the polyethylene terephthalate film manufactured as described above were coated by a simultaneous superimposition method by using a 4-lip die coater. The coating process was performed such that the upper layer (the magnetic layer) was coated with the magnetic coating material having the composition employed in Experiment 2 and the lower layer (the non-magnetic layer) was coated with the non-magnetic coating material having the following composition. Thus, the magnetic layer composed of the upper and lower layers were formed. The magnetic layer was subjected to a calender process so that a magnetic recording medium was obtained. The dry thickness of the upper layer was 0.25 μm and that of the lower layer was 2.0 μm.

<Non-Magnetic Coating Material for Lower Layer>

| | |
|---|---|
| α-Iron Oxide (average length of major axes = 0.15 μm, needle ratio = 12 and pH = 5.7) | 95 parts by weight |
| γ-Iron Oxide (average length of major axes = 0.2 μm and needle ratio = 9) | 5 parts by weight |

-continued

| | |
|---|---|
| Polyvinyl Chloride Resin (degree of polymerization = 150 containing a polar functional group which was potassium oxysulfonate by $5 \times 10^{-5}$ mol/g) | 20 parts by weight |
| Stearic Acid | 3 parts by weight |
| Heptyl Stearate | 3 parts by weight |
| Methylethylketone | 150 parts by weight |
| Cyclohexanone | 150 parts by weight |
| Polyisocyanate | 2 parts by weight |

Each magnetic recording medium manufactured as described above was formed into a disc shape having a diameter of 3.5 inches. Then, the magnetic discs were subjected to heat treatment at 50° C. for 48 hours. Finally, magnetic discs were obtained. The magnetic discs were those according to Example 15.

Magnetic discs were manufactured similarly to Example 15 except for the heat treatment temperatures being 70° C. and 90° C., respectively. The obtained magnetic discs were those according to Examples 16 and 17.

Magnetic discs were manufactured similarly to Examples 15 to 17 except for sample b being employed in place of sample a. The obtained magnetic discs were those according to Examples 18 to 20.

Magnetic discs were manufactured similarly to Examples 15 to 17 except for sample c being employed in place of sample a for making a comparison. The obtained magnetic discs were those according to Comparative Examples 7 to 9.

The degrees of deformation, durability and amounts of offtrack of the magnetic discs according to Examples 15 to 20 and Comparative Examples 7 to 9 were measured similarly to Experiment 1. Results were collectively shown in Table 5.

TABLE 5

| | Samples | Heat Treatment temperatures [° C.] | Amounts of Deformation of Magnetic Discs [mm] | Durability Against Movement [× 10,000 passes] | Amounts of Off-track [%] |
|---|---|---|---|---|---|
| Example 15 | a | 50 | 0.05 | 5000 or more | 3 |
| Example 16 | a | 70 | 0.07 | 5000 or more | 3 |
| Example 17 | a | 90 | 0.1 | 5000 or more | 5 |
| Example 18 | b | 50 | 0.1 | 5000 or more | 5 |
| Example 19 | b | 70 | 0.4 | 5000 or more | 6 |
| Example 20 | b | 90 | 0.8 | 5000 or more | 8 |
| Comparative Example 7 | c | 50 | 0.5 | damaged after 3500 passes | 8 |
| Comparative Example 8 | c | 70 | 1.0 | damaged after 3000 passes | 10 |
| Comparative Example 9 | c | 90 | 2.0 | damaged after 2000 passes | 12 |

Examples 7 to 20 had the structure that the difference $\Delta n_1$ between refractive indexes of the two main surfaces of the non-magnetic support member was $1 \times 10^{-3}$ or smaller, the thickness of the non-magnetic support member was 30 μm or greater and the coefficient of thermal contraction at 80° C. was 0.1% or lower. In accordance with results shown in Tables 3 to 5, the magnetic discs according to Examples 7 to 20 were able to prevent deformation thereof. Thus, excellent movement characteristic and durability were realized regardless of the temperature in the heat treatment. The magnetic discs according to Comparative Examples 4 to 6 had the structure that the difference $\Delta n_1$ between the refractive indexes of the two main surfaces was $1 \times 10^{-3}$ or smaller and the thickness was 30 μm or greater. However, the coefficients of thermal contraction were higher than 0.1% at 80° C. Thus, the magnetic discs according to Comparative Examples 4 to 6 encountered an excessively large amount of deformation of thereof regardless of the temperatures in the heat treatment. Thus, the obtained movement characteristic and the durability were unsatisfactory.

As can be understood from results of Examples 7 to 20, the following facts were understood: the structure that the coefficient of thermal contraction of the non-magnetic support member at 80° C. was 0.1% or lower enabled each non-magnetic support member to satisfactorily withstand heat treatment at relatively high temperatures even if the heat treatment temperatures were made to be relatively high levels of 50° C. to 100° C. for Examples 7 to 12, Example 14 and Examples 15 to 20. Therefore, the deformation of the magnetic disc can be reduced and thus satisfactory movement characteristic and durability can be obtained. When the heat treatment was performed at high temperatures, the crosslinking reactions of the polymer material of the magnetic layer were enhanced. Also the strength of the magnetic layer as the formed film was increased. As a result, the movement characteristic and the durability can be improved.

Results of Examples 7 to 20 will now be considered. Examples 7 to 12, Examples 15 and 20 had the structure that the heat treatment temperatures were 50° C. to 90° C. Examples 13 and 14 had the structure the heat treatment temperatures did not satisfy the foregoing range. When the foregoing results were compared with one another, the magnetic discs according to Examples 7 to 12 and Examples 15 to 20 were able to prevent deformation thereof. Thus, an excellent movement characteristic and durability can be obtained. Therefore, it is preferable that the heat treatment temperature satisfies the range from 50° C. to 90° C.

The results of Examples 7 to 12 each having the magnetic layer formed into a single layer and those of Examples 15 to 20 each having the magnetic layer formed into a double-layer structure composed of the upper layer and the lower layer will now be compared with one another. As can be understood from results of comparisons, results of both of the two types of structures were satisfactory. Therefore, a fact was confirmed that the present invention was able to applied to a magnetic recording medium having the magnetic layer formed into the laminated structure.

The magnetic recording medium according to the present invention has the structure that the difference $\Delta n_1$ between the refractive indexes of the two main surfaces of the non-magnetic support member is $1 \times 10^{-3}$ or smaller. Moreover, the thickness is 30 μm or greater and the coefficient of thermal contraction at 80° C. is 0.1% or lower. The magnetic recording medium according to the present invention having the above-mentioned structure is able to minimize deformation thereof.

As a result, the magnetic recording medium according to the present invention is able to realize satisfactorily uniform contact with the magnetic head. Therefore, wear occurring by dint of the contact with the magnetic head can be minimized. Thus, the movement durability can be improved. That is, the magnetic recording medium is able to satisfactorily prevent wear of the magnetic layer thereof even if the magnetic recording medium is used many times. Thus, life of the magnetic recording medium according to the present invention can be elongated.

When the magnetic recording medium according to the present invention is used to manufacture a magnetic disc, the amount of the magnetic disc can significantly be reduced. As a result, satisfactory contact with the magnetic head can be realized. Therefore, the magnetic layer of the magnetic disc can satisfactorily be prevented even if the magnetic disc is used many times. Thus, the rotation of the magnetic disc can smoothly be performed and reduction in the output can satisfactorily be prevented. Thus, the quality of the magnetic disc can be improved and the life of the same can be elongated because it can be used repeatedly.

The magnetic recording medium according to the present invention is able to satisfactorily prevent deformation thereof. Therefore, excellent contact with the magnetic head can be realized. Thus, tracking mistakes or the like can be decreased and thus the error rate can be lowered. As a result, a reliable recording/reproducing operation can be performed.

The magnetic recording medium according to the present invention has the structure that the coefficient of thermal contraction of the non-magnetic support member at 80° C. is 0.1% or lower. Therefore, the magnetic recording medium can be subjected to heat treatment at relatively high temperatures. Therefore, strong magnetic layers can be formed. Thus, the movement characteristic and the durability can be improved.

Since the deformation of the magnetic recording medium according to the present invention can satisfactorily be prevented, the gap from the magnetic head can be minimized to perform a dense recording operation. Since the thickness of each magnetic layer can be reduced in a predetermined range, a further dense recording operation can be performed.

As described above, the magnetic recording medium according to the present invention has the structure that the difference $\Delta n_1$ between the refractive indexes of the two main surfaces of the non-magnetic support member is $1 \times 10^{-3}$ or smaller. Therefore, the difference in the physical properties between the two main surfaces of the non-magnetic support member can be minimized. Therefore, the physical properties of the overall body of the non-magnetic support member can satisfactorily be uniformed. As a result, the magnetic recording medium according to the present invention is able to satisfactorily prevent deformation in a specific direction of the non-magnetic support member even after the magnetic recording medium has been preserved or the same has been subjected to heat treatment. As a result, the magnetic recording medium is able to satisfactorily prevent deformation thereof.

Therefore, the magnetic recording medium according to the present invention is able to satisfactorily be brought into contact with the magnetic head. Thus, change in the contact with the magnetic head can be minimized. Therefore, the magnetic recording medium can be used many times. Moreover, an error such as displacement of a track can significantly be prevented during a recording/reproducing operation. Thus, excellent movement characteristic, durability and recording/reproducing characteristic can be realized. As a result, a high linear recording density can be realized.

The magnetic recording medium according to the present invention has the structure that the thickness of the non-magnetic support member is 30 μm or greater. Thus, the ratio of the thickness of the non-magnetic support member with respect to the overall thickness of the magnetic recording medium can be raised. Therefore, the shape of the magnetic recording medium is determined by the shape of the non-magnetic support member. Thus, the magnetic recording medium according to the present invention is able to furthermore effectively prevent deformation thereof.

Moreover, the magnetic recording medium according to the present invention has the structure that the coefficient of thermal contraction of the non-magnetic support member at 80° C. is 0.1% or lower. Therefore, deformation of the non-magnetic support member in a specific direction which occurs when the heat treatment has been performed can be prevented. Also the foregoing structure enables the magnetic recording medium according to the present invention to be free from considerable deformation. As a result, change in the contact with the magnetic head can satisfactorily be prevented. Hence, the magnetic recording medium can be used many times, an error, such as displacement of a track, can be prevented during the recording/reproducing operation. Thus, satisfactory movement characteristic, durability and recording/reproducing characteristic can be realized.

The magnetic recording medium according to the present invention has the above-mentioned structure that the difference $\Delta n_2$ between a maximum value and a minimum value of the refractive indexes in each of the main surfaces is limited as described above. Therefore, the overall main surfaces of the non-magnetic support member have a satisfactorily uniform characteristics. As a result, the magnetic recording medium according to the present invention is able to satisfactorily prevent local deformation in each main surface of the non-magnetic support member even after the non-magnetic support member has been subjected to heat treatment or the magnetic recording medium has been preserved. As a result, the surface characteristic of the magnetic recording medium can be improved. Hence, a satisfactory state of contact between the magnetic recording medium according to the present invention and the magnetic head can be realized. As a result, the magnetic recording medium can be used many times, an error, such as displacement of a track, can significantly be prevented during the recording/reproducing operation. Thus, the movement characteristic, durability and the recording/reproducing characteristic can be improved.

When the magnetic recording medium according to the present invention is manufactured by forming a magnetic layer by coating the surface of a non-magnetic support member with a magnetic coating material mainly composed of ferromagnetic powder and a polymer material and by drying the magnetic coating material; by performing a flattening and smoothing step for flattening and smoothing the surface of the magnetic layer; by punching, into a disc shape, the non-magnetic support member having the magnetic layer formed thereon so that a magnetic disc is manufactured; and performing a heat treatment step for performing heat treatment of the magnetic disc at temperatures higher than a glass transition point of the polymer material and lower than a glass transition point of the non-magnetic support member, wherein the non-magnetic support member is a biaxially-oriented polyethylene terephthalate film having two main surfaces, difference $\Delta n_1$ between refractive indexes of which is $1 \times 10^{-3}$ or smaller, the thickness of the non-magnetic support member is 30 μm or greater and a coefficient of thermal contraction of the non-magnetic support member at 80° C. is 0.1% or lower. Thus, if the magnetic coating material contains thermosetting polyisocyanate which is a crosslinking compound, the magnetic layer is able to withstand heat treatment temperatures, for example, from 50° C. to 90° C. which are sufficiently high to enhance crosslinking reactions of the crosslinking compound. As a result, the strength of the magnetic layer can be increased, causing the movement characteristic and durability of the magnetic recording medium to be improved.

Although the invention has been described in its preferred form with a certain degree of particularity, it is understood that the present disclosure of the preferred form can be changed in the details of construction and in the combination and arrangement of parts without departing from the spirit and the scope of the invention as here in after claimed.

What is claimed is:

1. A magnetic recording medium comprising:

a non-magnetic support member composed of a biaxially-oriented polyethylene terephthalate film; and a magnetic layer formed on at least one of the main surfaces of said non-magnetic support member and containing at least ferromagnetic powder and a polymer material, wherein difference $\Delta n_1$ between refractive indexes of the two main surfaces of said non-magnetic support member is $1 \times 10^{-3}$ or smaller.

2. A magnetic recording medium according to claim 1, wherein said magnetic layer is formed on each of the two main surfaces of said non-magnetic support member.

3. A magnetic recording medium according to claim 1, wherein difference $\Delta n_2$ between a maximum value and a minimum value of the refractive index of each of the main surfaces of said non-magnetic support member is $15 \times 10^{-3}$ or smaller.

4. A magnetic recording medium according to claim 1, wherein the thickness of said magnetic layer is 2.0 μm or smaller.

5. A magnetic recording medium according to claim 1, wherein the thickness of said non-magnetic support member is 30 μm or greater.

6. A magnetic recording medium according to claim 5, wherein a coefficient of thermal contraction of said non-magnetic support member at 80° C. is 0.1% or lower.

7. A magnetic recording medium according to claim 6, wherein said magnetic layer contains thermosetting polyisocyanate.

8. A magnetic recording medium according to claim 1, wherein said magnetic layer is formed by laminating an upper layer and a lower layer, and at least said upper layer is formed into a magnetic layer containing ferromagnetic powder and a polymer material.

9. A magnetic recording medium according to claim 8, wherein said lower layer is formed into a non-magnetic layer mainly composed of non-magnetic powder and a polymer material.

10. A method of manufacturing a magnetic recording medium, comprising:

a coating step for forming a magnetic layer by coating the surface of a non-magnetic support member with a magnetic coating material mainly composed of ferromagnetic powder and a polymer material and by drying the magnetic coating material;

a step for flattening and smoothing the surface of said magnetic layer;

a cutting step for manufacturing a magnetic disc by punching, into a disc shape, said non-magnetic support member having said magnetic layer formed thereon; and a heat treatment step for performing heat treatment of said magnetic disc at temperatures higher than a glass transition point of said polymer material and lower than a glass transition point of said non-magnetic support member, wherein said non-magnetic support member is a biaxially-oriented polyethylene terephthalate film having two main surfaces, difference $\Delta n_1$ between refractive indexes of which is $1 \times 10^{-3}$ or smaller, the thickness of said non-magnetic support member is 30 μm or greater and a coefficient of thermal contraction of said non-magnetic support member at 80° C. is 0.1% or lower, said magnetic coating material contains thermosetting polyisocyanate, and the heat treatment in said heat treatment step is performed under a temperature condition of 50° C. to 90° C.

* * * * *